United States Patent
Petersson et al.

(10) Patent No.: US 11,572,039 B2
(45) Date of Patent: Feb. 7, 2023

(54) CONFIRMED AUTOMATED ACCESS TO PORTIONS OF VEHICLES

(71) Applicant: Volvo Car Corporation, Gothenburg (SE)

(72) Inventors: Max Petersson, Gothenburg (SE); Peter Daniel Härslätt, Torslanda (SE); Ashok Krishna Chaitanya Koppisetty, Gothenburg (SE); Tessa Koelewijn, Ödsmål (SE); Mats Erik Gjertz, Stenungsund (SE); Hans Olof Herman Johnsson, Gothenburg (SE); Bastian Havers, Gothenburg (SE); Asli Pehlivan Rhodin, Gothenburg (SE); Stian Skolemestra, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 178 days.

(21) Appl. No.: 16/743,704

(22) Filed: Jan. 15, 2020

(65) Prior Publication Data
US 2021/0213909 A1    Jul. 15, 2021

(51) Int. Cl.
*B60R 25/25* (2013.01)
*G06F 21/32* (2013.01)
(Continued)

(52) U.S. Cl.
CPC ............. *B60R 25/25* (2013.01); *B60Q 1/50* (2013.01); *B60R 25/01* (2013.01); *B60R 25/305* (2013.01);
(Continued)

(58) Field of Classification Search
None
See application file for complete search history.

(56) References Cited

U.S. PATENT DOCUMENTS 9,373,201 B2 * 6/2016 Jefferies .............. B60R 25/2018
10,449,930 B1 * 10/2019 Silva .................... G06N 3/006
(Continued)

FOREIGN PATENT DOCUMENTS

DE    102017218542 A1    8/2018
DE    102017214879 A1    2/2019
(Continued)

OTHER PUBLICATIONS

Tolba et al., "Face Recognition: A Literature Review," International Journal of Computer, Electrical, Automation, Control and Information Engineering, vol. 2, No. 7, 2008, 16 pp. (Applicant points out, in accordance with MPEP 309.04(a), that the year of publication, 2008, is sufficiently earlier than the effective U.S. filing date, so that the particular month of publication is not in issue.).

(Continued)

*Primary Examiner* — Carlos Garcia
(74) *Attorney, Agent, or Firm* — Shumaker & Sieffert, P.A.

(57) ABSTRACT

In general, techniques are described by which provide confirmed automated access to portions of vehicles. A control system comprising a processor, and a memory may be configured to perform the techniques. The memory may store instructions that, when executed, cause the processor to determine that the authorized operator of the vehicle is intending to access a portion of the vehicle, and output, responsive to determination, a confirmation request to the authorized operator. The confirmation request may request confirmation that the authorized operator is intending to access the portion of the vehicle. The memory may also store instructions that, when executed, cause the processor to receive, from the authorized operator, a confirmation response indicating whether the authorized operator is intending to access at least the portion of the vehicle, and (Continued)

automatically open, based on the confirmation response, at least the portion of the vehicle.

18 Claims, 4 Drawing Sheets

(51) Int. Cl.
| | |
|---|---|
| *B60W 40/08* | (2012.01) |
| *B60R 25/30* | (2013.01) |
| *B60R 25/31* | (2013.01) |
| *B60Q 1/50* | (2006.01) |
| *B60R 25/01* | (2013.01) |
| *G06V 40/16* | (2022.01) |

(52) U.S. Cl.
CPC ............ *B60R 25/31* (2013.01); *B60W 40/08* (2013.01); *G06F 21/32* (2013.01); *G06V 40/173* (2022.01); *B60R 2300/8073* (2013.01); *B60W 2040/0809* (2013.01)

(56) References Cited

U.S. PATENT DOCUMENTS

| | | | | |
|---|---|---|---|---|
| 10,625,584 | B2* | 4/2020 | Li | E05F 15/611 |
| 2015/0291126 | A1* | 10/2015 | Nicholls | E05F 15/73 |
| | | | | 701/49 |
| 2016/0274669 | A1* | 9/2016 | Hsiao | B60H 1/00278 |
| 2017/0074000 | A1* | 3/2017 | Banvait | G07C 9/00571 |
| 2017/0180388 | A1* | 6/2017 | Belz | H04L 63/105 |
| 2018/0012433 | A1* | 1/2018 | Ricci | G06F 16/248 |

FOREIGN PATENT DOCUMENTS

| | | |
|---|---|---|
| GB | 2510019 A | 7/2014 |
| GB | 2542274 A | 3/2017 |
| WO | 2013082725 A1 | 6/2013 |

OTHER PUBLICATIONS

Wongchoosuk, et al., "Identification of People from Armpit Odor Region Using Networked Electronic Nose," Research Gate, Aug. 2011, 5 pp.

Rudrapal et al., "Voice Recognition and Authentication as a Proficient Biometric Tool and its Application in Online Exam for P.H People," International Journal of Computer Application (0975-8887), vol. 39, No. 12, Feb. 2012, 7 pp.

* cited by examiner

CONFIRMED AUTOMATED ACCESS TO PORTIONS OF VEHICLES

TECHNICAL FIELD

This disclosure relates to vehicles and, more specifically, enabling automated access to vehicles.

BACKGROUND

Vehicles are increasingly featuring a number of automated and interactive capabilities in which the vehicle may respond to various conditions. For example, a vehicle may automatically unlock and open a tailgate responsive to an authorized operator interacting with a sensor capable of sensing movements (e.g., a foot movement) of the authorized operator. As such, the vehicle may automatically open the tailgate without requiring the authorized operator to directly engage with a lock or lever of the tailgate, which may be beneficial when hands of the authorized operator are occupied or for convenience (e.g., carrying items) such that direct interaction with the tailgate may become challenging.

SUMMARY

In general, techniques are described for providing automated access to portions of vehicle, such as a trunk or other compartment of the vehicle. Rather than require an authorized operator of the vehicle to interact with the vehicle in order to signal that the tailgate or other portion of the vehicle should be opened (e.g., via a foot movement), the vehicle may automatically determine that the authorized operator of the vehicle is intending to access at least the portion of the vehicle. For example, the vehicle may capture (or, in other words, acquire) an image of the authorized operator and perform image analysis with respect to the one or more images to determine an occupancy of one or more hands of the authorized operator in order to determine whether the authorized operator is intending to access the trunk or other compartment of the vehicle. The vehicle may then initiate a confirmation request to the authorized operator, where the confirmation request requests confirmation that the authorized operator is intending to access the trunk of the vehicle. Responsive to receiving a conformation response from the authorized operator, the vehicle may then automatically open the trunk.

In this respect, the techniques may enable the vehicle to automate access to the vehicle when the hands of the authorized operator are occupied without requiring any direct interaction with the vehicle that may involve awkward movements, such as a foot movement. By avoiding awkward movements to unlock and open a trunk or other compartment, the vehicle may reduce potential injuries (e.g., resulting from attempting to balance on one foot to make the foot movement, especially in inclement weather involving ice, snow, rain, etc.) and operator frustration (as the sensors for detecting, as one example, the foot movement are not readily visible to the operator and potentially difficult to engage as a result of the lack of visibility).

In one example, aspects of the techniques are directed to a method comprising: determining, by a control system configured to control one or more aspects of a vehicle, that an authorized operator of the vehicle is intending to access at least a portion of the vehicle; outputting, by the control system and responsive to determining that the authorized operator of the vehicle is intending to access the portion of the vehicle, a confirmation request to the authorized operator, the confirmation request requesting confirmation that the authorized operator is intending to access at least the portion of the vehicle; receiving, by the control system, from the authorized operator, a confirmation response indicating whether the authorized operator is intending to access at least the portion of the vehicle; and automatically opening, by the control system, and based on the confirmation response, at least the portion of the vehicle.

In another example, aspects of the techniques are directed to a control system configured to control one or more aspects of a vehicle associated with an authorized operator, the control system comprising: one or more processors; and a memory comprising instructions that, when executed by the one or more processors, cause the one or more processors to: determine that the authorized operator of the vehicle is intending to access at least a portion of the vehicle; output, responsive to determining that the authorized operator of the vehicle is intending to access the portion of the vehicle, a confirmation request to the authorized operator, the confirmation request requesting confirmation that the authorized operator is intending to access at least the portion of the vehicle; receive, from the authorized operator, a confirmation response indicating whether the authorized operator is intending to access at least the portion of the vehicle; and automatically open, based on the confirmation response, at least the portion of the vehicle.

In another example, aspects of the techniques are directed to a computer-readable storage medium comprising instructions that, when executed by at least one processor of a control system configured to control one or more aspects of a vehicle associated with an authorized operator, cause the at least one processor to: determine that the authorized operator of the vehicle is intending to access at least a portion of the vehicle; output, responsive to determining that the authorized operator of the vehicle is intending to access the portion of the vehicle, a confirmation request to the authorized operator, the confirmation request requesting confirmation that the authorized operator is intending to access at least the portion of the vehicle; receive, from the authorized operator, a confirmation response indicating whether the authorized operator is intending to access at least the portion of the vehicle; and automatically open, based on the confirmation response, at least the portion of the vehicle.

In another example, aspects of the techniques are directed to a control system configured to control one or more aspects of a vehicle associated with an authorized operator, the control system comprising: means for determining that the authorized operator of the vehicle is intending to access at least a portion of the vehicle; means for outputting, responsive to determining that the authorized operator of the vehicle is intending to access the portion of the vehicle, a confirmation request to the authorized operator, the confirmation request requesting confirmation that the authorized operator is intending to access at least the portion of the vehicle; means for receiving, from the authorized operator, a confirmation response indicating whether the authorized operator is intending to access at least the portion of the vehicle; and means for automatically opening, based on the confirmation response, at least the portion of the vehicle.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
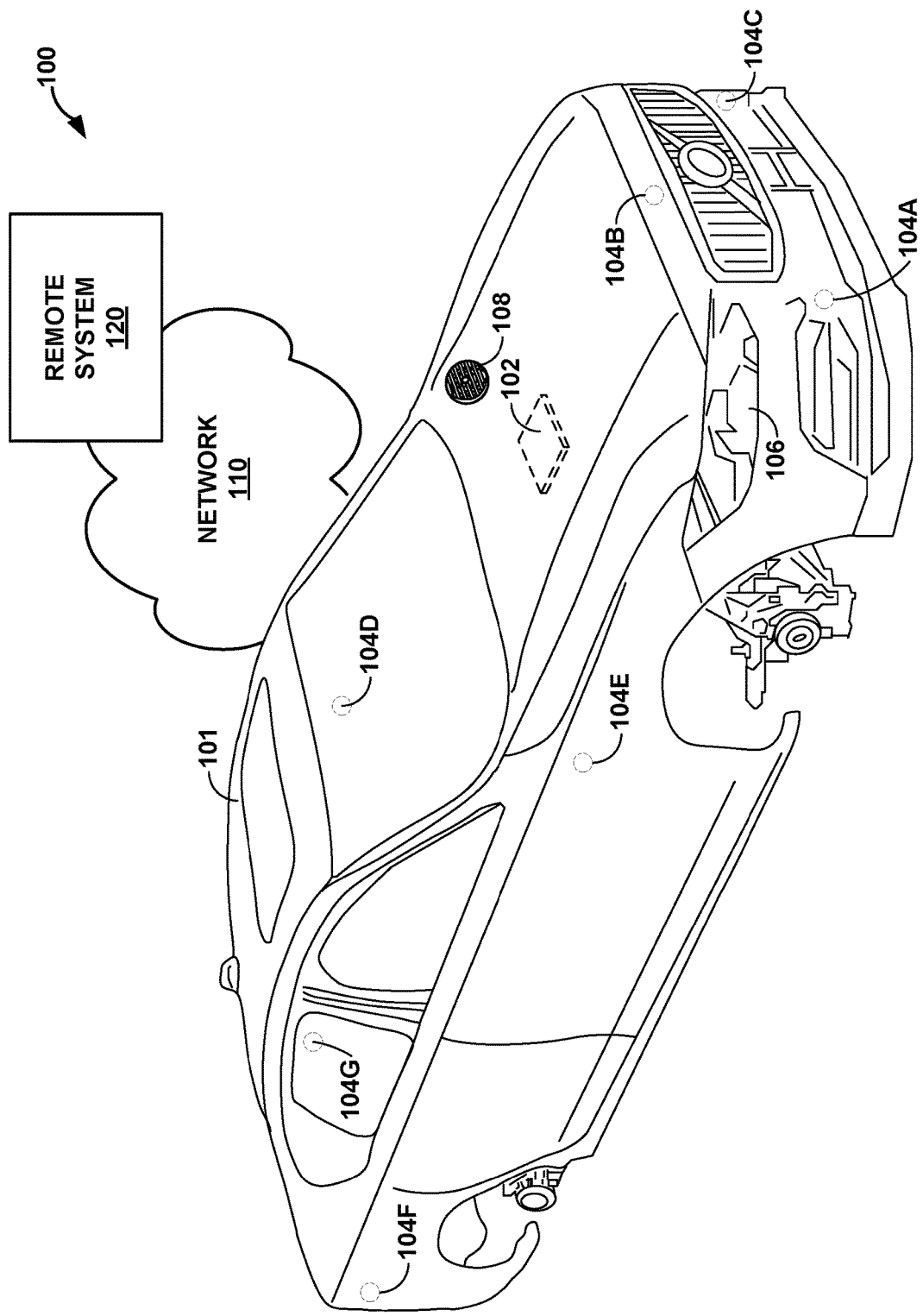
FIG. 1 is a diagram illustrating an example system configured to perform various aspects of the automated access techniques described in this disclosure.

FIG. 1 is a diagram illustrating an example system configured to perform various aspects of the automated access techniques described in this disclosure. As shown in the example of FIG. 1, system 100 includes a vehicle 101, a network 110, and a remote system 120.

Although shown as an automobile in the example of FIG. 1, vehicle 101 may represent any type of vehicle, including an automobile, a truck, farm equipment, a motorcycle, a bike (including electronic bikes), a scooter, construction equipment, a semi-truck, an airplane, a helicopter, a military vehicle, or any other type of vehicle capable of implementing various aspects of the automated access techniques described in this disclosure.

Network 110 may represent any type of network by which communication between vehicle 101 and remote system 120 may be accomplished. Network 110 may represent a public network (e.g., the Internet), a private network, a cellular network (including various cellular data network, such as a 3G, 4G and/or 5G network), a personal area network, or combinations thereof.

Remote system 120 may represent one or more devices configured to communicate via network 110 with vehicle 101. Remote system 120 may communicate via network 110 with vehicle 101 to monitor or otherwise retrieve diagnostic data concerning one or more components of vehicle 101, such as an engine, an anti-lock braking system (ABS), a traction control (TC) system, an electronic stability control (ESC) system, brake system, heads-up display system, coolant system, navigation system, infotainment system, a camera (or any other type of sensor), or any other component or system integrated into vehicle 101 or in communication with vehicle 101. Remote system 120 may, in addition or as an alternative to monitoring vehicle 101, communicate with vehicle 101 to update one or more of the above noted components of vehicle 101. Remote system 120 may, for example, represent a system that supports the Volvo On Call™ service.

As further shown in the example of FIG. 1, vehicle 101 includes a computing system 102 and a plurality of sensors 104A-104G ("sensors 104"). Computing system 102 and some of sensors 104 are shown in the example of FIG. 1 using dashed lines to denote that computing system 102 and sensors 104 may not be visible or are otherwise integrated within vehicle 101.

Computing system 102 may include one or more electronic control unit (ECUs) and a computing device. For example, computing system 102 may include an ECU configured to control the ABS (which may also control TC), an ECU configured to control the ECS system, and a main ECU acting as the computing device to direct operation of all of the systems (including those not listed in this example). Generally, an ECU includes a microcontroller, and memory (such as one or more of static random access memory—SRAM, electrically erasable programmable read-only memory—EEPROM, and Flash memory), digital and/or analog inputs, digital and/or analog outputs (such as relay drivers, H bridge drivers, injector drivers, and logic outputs).

In some examples, rather than utilize an ECU as the computing device, computing system 102 may include a relatively more powerful processor (compared to the microcontroller) configured to execute instructions or other forms of software to perform various aspects of the machine learning based vehicle diagnostic techniques described in this disclosure. The processor may represent one or more of fixed function, programmable, or combinations thereof, such as microprocessors, digital signal processors (DSPs), application specific integrated circuits (ASICs), field programmable gate arrays (FPGAs), discrete logic, software, hardware, firmware or any combinations thereof. When the techniques are implemented partially in software, computing system 102 may store instructions for the software in a suitable, non-transitory computer-readable storage medium and execute the instructions in hardware using one or more processors to perform the techniques of this disclosure. A device including computing system 102 may comprise an integrated circuit, and/or a microprocessor.

For purposes of illustration, computing system 102 is assumed to represent a processor communicatively coupled to one or more ECUs responsible for controlling operation of various systems. The processor may form part of a control system in which the processor and ECUs operate to interact with sensors 104. That is, the ECUs may retrieve and otherwise manage interactions with sensors 104, whereupon the processor may interface with the ECUs to collect the data collected by the sensors 104. As such, computing system 102 may also be referred to as a "control system 102," where control system 102 may be configured to control one or more aspects of vehicle 101 (such as the locks, automated door operation system, anti-lock braking system, heating, ventilation, and air conditioning (HVAC) system, infotainment system, etc.).

Sensors 104 may include a camera or any other imaging systems like LIDAR or RADAR a chemical scent detector (which may be referred to as an artificial olfactory sensor, or an electronic nose—e-nose), a microphone, a global positioning system (GPS) unit, and/or any other type of sensor capable of facilitating automated access to vehicle 101. As such, the data provided by sensors 104 may include an image (including a temporal collection of images that form video data), scent data indicative of a chemical scent in the vicinity of vehicle 101, audio data indicative of sounds within the vicinity of vehicle 101, GPS coordinate data indicative of a current location of vehicle 101, and/or any other type of sensor data that may facilitate automated access to vehicle 101.

In some instances, vehicles may automatically unlock and open a tailgate responsive to an authorized operator interacting with a sensor capable of sensing movements (e.g., a foot movement) of the authorized operator. That is, the sensor may be located underneath a rear bumper of these vehicles and may sense when an authorized operator moves their foot in a particular location proximate to the rear bumper sensor. Responsive to sensing the foot movement of the authorized operator, the vehicle may automatically open the tailgate without requiring the authorized operator to directly engage with a lock or lever of the tailgate, which may be beneficial when hands of the authorized operator are occupied (e.g., carrying items) such that direct interaction with the tailgate may become challenging.

However, balancing on one foot while moving the other foot to interact with the rear bumper sensor may be challenging and potentially dangerous, especially when carrying heavy or cumbersome objects, bags, packages, etc. The likelihood of falling while attempting to interact with the rear bumper sensor may increase during inclement weather involving ice, snow and/or rain as it may become even more difficult to balance on one foot during these conditions, especially again while carrying heavy or cumbersome objects, bags, packages, etc.

Furthermore, due to the location of the rear bumper sensor being placed underneath the rear bumper, it may be difficult for the authorized operator to interact with the rear bumper sensor as the sensor is not visible, and further resulting in the authorized operator randomly moving their foot under the rear bumper in an effort to interact with the sensor. The difficulty in interacting with the rear bumper sensor may cause the authorized operator to experience frustration and decrease the likelihood that the authorized operator attempts to engage with the rear bumper sensor, especially when such automated access is most needed (such as during times of inclement weather).

In accordance with various aspects of the techniques described in this disclosure, vehicle 101 may provide automated access to portions of vehicle, such as a trunk or other compartment of the vehicle. Rather than require an authorized operator of vehicle 101 to interact with the vehicle in order to signal that the tailgate or other portion of the vehicle should be opened (e.g., via a foot movement), vehicle 101 may automatically determine that the authorized operator of the vehicle is intending to access at least the portion of the vehicle. For example, vehicle 101 may capture (or, in other words, acquire) an image of the authorized operator and perform image analysis with respect to the one or more images to determine an occupancy of one or more hands of the authorized operator in order to determine whether the authorized operator is intending to access the trunk or other compartment of vehicle 101. Vehicle 101 may then output a confirmation request to the authorized operator, where the confirmation request requests confirmation that the authorized operator is intending to access the trunk (or other compartment, door, etc.) of vehicle 101. Responsive to receiving a conformation response from the authorized operator, vehicle 101 may then automatically open the trunk (or other compartment, door, etc.).

Vehicle 101 may include an automated opening mechanism (which is not shown in the example of FIG. 1 for ease of illustration purposes) by which to automatically open, without requiring physical input or electronic communication from the authorized operated, at least the portion of the vehicle. As such, control system 102 may interface with the automated opening mechanism to automatically open the portion of vehicle 101.

In this respect, the techniques may enable vehicle 101 to automate access to vehicle 101 when the hands of the authorized operator are occupied without requiring any direct interaction with the vehicle that may involve awkward movements, such as the above noted foot movement. By avoiding awkward movements to unlock and open a trunk or other compartment of vehicle 101, vehicle 101 may reduce potential injuries (e.g., resulting from attempting to balance on one foot to make the foot movement, especially in inclement weather involving ice, snow, rain, etc.) and operator frustration (as the sensors for detecting, as one example, the foot movement are not readily visible to the operator and potentially difficult to engage as a result of the lack of visibility).

In operation, control system 102 may first authenticate a person approaching vehicle 101 as authorized to access vehicle 101 (or, in other words, that the person is the authorized operator of vehicle 101). In some instances, control system 102 may interface via a wireless protocol (e.g., Bluetooth®, WiFi™, etc.) with a key fob in possession of the person, and authenticate the person as the authorized operator based on the presence of the key fob associated with vehicle 101 in proximity to vehicle 101 (but external to vehicle 101).

In these and other instances, the key fob may be replaced or augmented with a smart device (such as a so-called "smart phone," "smart watch," or other smart device), whereupon vehicle 101 is associated with the smart device, which may execute an application by which to interface with vehicle 101. In these instances, control system 102 may authenticate the person as the authorized operator based on a wireless connection with the smart device, which may operate similar to the key fob in order to authenticate the person as the authorized operator when in the vicinity of vehicle 101 (but external to vehicle 101).

In conjunction with or as an alternative to the above authentication procedures involving a key fob and/or smart device, control system 102 may interface with sensors 104 to retrieve image data, scent data, and/or audio data, and authenticate the person approaching vehicle 101 based on one or more of the image data, scent data, and/or audio data. For example, control system 102 may perform image analysis with respect to the image data to authenticate the person approaching vehicle 101 as the authorized operator. The image analysis may include facial recognition in which control system 102 analyzes facial geometries of the person captured by the image data. More information regarding facial recognition can be found in the paper by Tolba et al., entitled "Face Recognition: A Literature Review," published in the International Journal of Computer, Electrical, Automation, Control and Information Engineering, Volume 2, Number 7, dated 2008.

As another example, control system 102 may perform scent recognition with respect to the scent data to identify the person as the authorized operator. More information regarding scent recognition can be found in an article by Wongchoosuk et al., entitled "Identification of People from Armpit Odor Region using Networked Electronic Nose," and presented in 2011 at the Defense Science Research Conference and Expo.

Control system 102 may, as a further example, perform voice recognition with respect to the audio data to identify the person as the authorized operator. That is, control system 102 may perform voice recognition with respect to the audio data to authenticate the person as the authorized operator (where voice recognition for the purposes of authentication may be referred to as "voice authentication"). More information regarding voice recognition for authentication can be found in an article by Rudrapal et al., entitled "Voice Recognition and Authentication as a Proficient Biometric Tool and its Application in Online Exam for P.H People," published in the International Journal of Computer Applications (0975-8887), Volume 39, Number 12, and dated February 2012.

Responsive to authenticating the person as the authorized operator in accordance with one or more of the above processes, control system 102 may next determine that the authorized operator of vehicle is intending to access at least a portion, such as a trunk or other compartment, main cabin, etc., of vehicle 101. Control system 102 may interface with one or more of sensors 104 in various ways to retrieve data by which to determine that the authorized operator of vehicle 101 is intending to access the portion of vehicle 101. For example, control system 102 may interface with ECUs that control operation of a camera to retrieve one or more images of the authorized operator. Control system 102 may next perform image analysis with respect to the one or more images to determine an occupancy of one or more hands of the authorized operator. Based on the determined occupancy of the one or more hands of the authorized operator (e.g., when the one or more hands of the authorized operator are occupied with bags, parcels, and/or other items), control system 102 may determine that the authorized operator is intending to access the portion of vehicle 101.

In some instances, as either as alternative to or in conjunction with the above image analysis, control system 102 may obtain past access data indicative of past accesses of the portion of the vehicle, and predict, based on the past access data, present access data indicative of a probability that the authorized operator is intending to access the portion of vehicle 101. Control system 102 may locally store the past access data or retrieve the past access data from remote system 120, a smart device associated with the authorized operator, and/or some other device associated with the authorized operator (e.g., a computer or other network connected device accessible via network 110). Control system 102 may then determine, based on the present access data, that the authorized operator is intending to access the portion of vehicle 101.

In addition or as an alternative to any combination of the foregoing determinations that the authorized operator is intending to access the portion of vehicle 101, control system 102 may interface (potentially via ECUs) with sensors 104 to capture (or, in other words, acquire) audio data representative of a voice of the authorized operator. Control system 102 may perform an auditory analysis with respect to the audio data to determine whether the audio data indicates that the authorized operator is intending to access the portion of vehicle 101. That is, control system 102 may perform voice recognition to determine whether the audio data indicates that the authorized operator is requesting that the portion of vehicle 101 be opened.

Responsive to determining that the authorized operator is intending to access the portion of vehicle 101, control system 102 may output a confirmation request to the authorized operator. The confirmation request may request confirmation that the authorized operator is intending to access the portion of vehicle 101.

Control system 102 may output the confirmation request in one or more different ways. For example, control system 102 may interface (potentially via one or more ECUs) with an external light 106 (or more than one external light although a single external light 106 is shown in the example of FIG. 1), outputting a light signal to external light 106 that causes external light 106 to blink off and on as a prompt for the confirmation request. External light 106 is shown in the example of FIG. 1 as a headlight, but external light 106 may refer to any external light, including blinkers, tail lights, brake lights, vanity plate lights, etc.

Alternatively or in addition to blinking external light 106, control system 102 may interface with (possibly via one or more ECUs) a sound unit 108 (which may represent a vehicle horn in the example of FIG. 1), outputting a sound signal to sound unit 108 that causes sound unit 108 to emit one or more sounds as confirmation request that prompts the authorized operator to provide a confirmation response. The sounds may for example include short car horn bursts, beeps, security system sounds, and the like.

The authorized operator may then issue, responsive to the confirmation request, a confirmation response indicating whether the authorized operator is intending to access the portion of vehicle 101. As such, control system 102 may receive, from the authorized operator, the confirmation response.

Control system 102 may, as one example, obtain the confirmation response by obtaining one or more images of the authorized person via one or more of sensors 104 (e.g., a camera). Control system 102 may next perform image analysis with respect to the one or more images to identify a visual confirmation response. Examples of the visual confirmation response include a gesture, such as a hand gesture (e.g., a thumbs up hand gesture or a thumbs down hand gesture), a head gesture (such as nodding "yes" or "no"), a facial gesture (such as smiling or frowning). Control system 102 may identify the visual confirmation response as the confirmation response.

In addition to or as an alternative to obtaining the visual confirmation response, control system 102 may obtain audio data (via interactions with sensors 104—e.g., a microphone, possibly via ECUs) representative of a voice of the authorized operator. Control system 102 may next perform audio analysis with respect to the audio data to identify an auditory confirmation response. The auditory confirmation response may include spoken words or phrases, such as "yes" or "no," "please" or "no thank you," "open" or "close" and the like. Control system 102 may then identify the auditory confirmation response as the confirmation response (or one of multiple confirmation responses in the case that both visual and auditory confirmation responses are employed).

Based on the confirmation response, control system 102 may interact with the portion of vehicle 101 (possibly via the ECUs) to automatically open (and possibly unlock) the portion of vehicle 101. In this respect, vehicle 101 may automate access to the vehicle when the hands of the authorized operator are occupied without requiring any direct interaction with vehicle 101 that may involve awkward movements, such as a foot movement. By avoiding awkward movements to unlock and open a trunk or other compartment, vehicle 101 may reduce potential injuries (e.g., resulting from attempting to balance on one foot to make the foot movement, especially in inclement weather involving ice, snow, rain, etc.) and operator frustration (as the sensors for detecting, as one example, the foot movement are not readily visible to the operator and potentially difficult to engage as a result of the lack of visibility).

Although described as computing system 102 determining that the authorized operator of the vehicle is intending to access the portion of vehicle 101, identifying the confirmation response, and automatically opening the portion of vehicle 101, computing system 102 may, in addition or alternatively, interface with remote system 120 via network 110 to perform the foregoing operations. Accordingly, while described as computing system 102 performing various aspects of the techniques described in this disclosure, remote system 120 or a combination of computing system 102 and remote system 120 may perform one or more aspects of the techniques described in this disclosure.

Moreover, although described with respect to automated opening of the portion of vehicle 101, various aspects of the techniques may also enable computing system 102 to automate closing of one or more portions of vehicle 101. For example, computing system 102 may use any of the foregoing described ways by which to determine that the authorized operator has finished accessing at least the portion of vehicle 101. In these instances, computing system 102 may interface with the automated opening mechanism to close the one or more portions of vehicle 101, and thereby close, responsive to determining that the authorized operator is finished accessing at least the portion of vehicle 101, at least the portion of vehicle 101.

Figure 2:
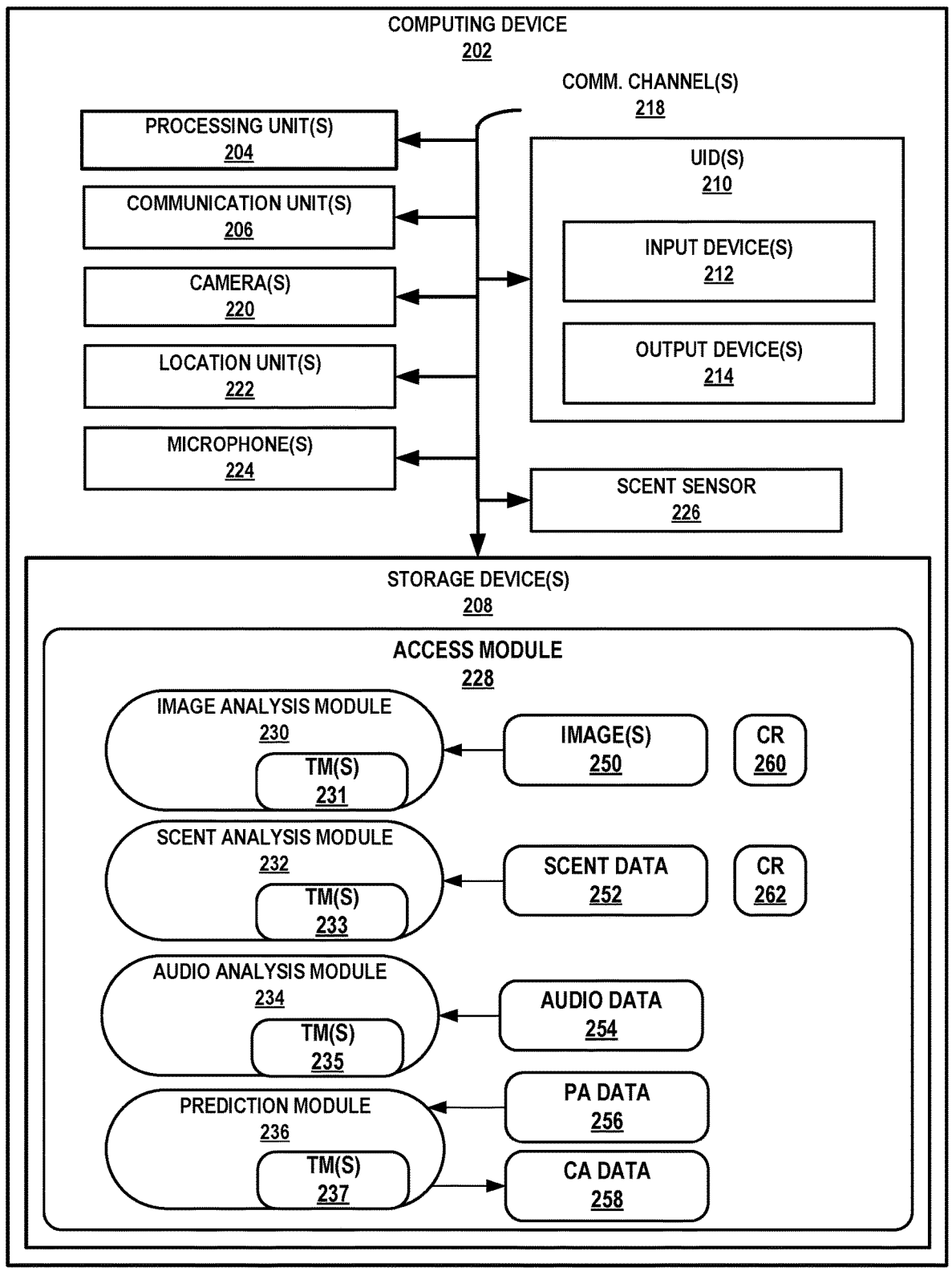
FIG. 2 is a block diagram illustrating an example device configured to perform various aspects of the secure temporary access techniques described in this disclosure.

FIG. 2 is a block diagram illustrating an example device configured to perform various aspects of the secure temporary access techniques described in this disclosure. Computing device 202 represents an example of the control system described above. As illustrated in FIG. 2, computing device 202 includes at least one processing unit 204, at least one communication unit 206, at least one storage device 208, at least one user interface device (UID) 210, at least one communication channel 218, at least one camera 220, and at least one location unit 222. FIG. 2 illustrates only one particular example of computing device 202, and many other examples of computing device 202 may be used in other instances and may include a subset of the components included in example computing device 202 or may include additional components not shown in FIG. 2, such as the above noted ECUs and/or interfaces for interacting with the ECUs.

Processing units 204 may represent a unit implemented as fixed-function processing circuits, programmable processing circuits, or a combination thereof. Fixed-function circuits refer to circuits that provide particular functionality and are pre-set on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

Communication units 206 may represent a unit configured to communicate with one or more other computing devices by transmitting and/or receiving data. Communications units 206 may include wired and/or wireless communication units. Examples of wired communication units 206 include Universal Serial Bus (USB) transceivers. Examples of wireless communication units 206 include GPS radios, cellular (e.g., LTE) radios, Bluetooth™ radios, WiFi™ radios, or any other wireless radios.

In some examples, storage device 208 may represent a unit configured to store modules 230-236. Storage device 208 may be a temporary memory (which is an example of a non-transitory computer-readable medium), meaning that a primary purpose of storage device 208 is not long-term storage. Storage device 208 may be configured for short-term storage of information as volatile memory and therefore not retain stored contents after being powered off. Examples of volatile memories include random access memories (RAM), dynamic random-access memories (DRAM), static random-access memories (SRAM), and other forms of volatile memories known in the art.

Storage device 208 may include one or more non-transitory computer-readable storage devices capable of long-term storage that retain data after being powered off. Storage device 208 may be configured to store larger amounts of information than typically stored by volatile memory. Storage device 208 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage device 208 may store program instructions and/or information (e.g., data) that, when executed, cause processing unit 204 to perform the techniques of this disclosure. For example, storage device 208 may include data or information associated with one or more of modules 230-236.

User interface devices (UID) 210 may represent a unit configured to enable a user to interact with computing device 202. UIDs 210 may include one or more input devices 212 and/or more output devices 214. Examples of input devices 212 include display devices, keyboards, pointing devices (such as a mouse or digital pen), microphones, physical buttons or knobs, among others. Examples of output devices 214 include display devices and speakers (including a car or other type of horn, such as sound unit 108 shown in the example of FIG. 1), lights (including external lights, such as external light 106 shown in the example of FIG. 1) among others. Display devices may include touchscreens (e.g., capacitive or resistive). Example display devices include liquid crystal displays (LCD), light emitting diode (LED) displays, organic light-emitting diode (OLED) displays, e-ink, or other device configured to display information to a user.

Communication channels 218 may represent a unit configured to interconnect each of components 204, 206, 208, 210, 220, 222, 224, and/or 226 for inter-component communications (physically, communicatively, and/or operatively). In some examples, communication channels 218 may include a system bus, a network connection, one or more inter-process communication data structures, or any other components for communicating data.

Camera 220 represents a unit configured to capture (or, in other words, acquire) one or more images of a scene. Camera 220 may include any type of unit configured to capture images, including an infrared camera, a color camera, a monochrome camera, or any other type of camera. Camera 220 may include a lens, an array of pixel sensors, and other components arranged in a manner that facilitate digital capture of images. Although shown as included within computing device 202, one or more of cameras 220 may be external from computing device 202 but communicatively coupled, via either wired or wireless connection, to computing device 202 (such as represented by sensor 104 in the example of FIG. 1). Camera 220 may be integrated within vehicle 101 (e.g., meaning built into various aspects of vehicle 101, including interior or exterior panels, review mirrors, side mirrors, trunks, glove boxes, engine bays, etc.) or external to vehicle 101 (e.g., meaning after-market cameras added after manufacture and not integrated into various aspects of vehicle 101, including dashboard cameras, add-on backup cameras, etc.). Camera 220 may represent any one of sensor 104 shown in the example of FIG. 1.

Location unit 222 may represent a unit configured to obtain a location of computing device 202. Location unit 222 may represent, as an example, one or more of a global positioning system (GPS), a global navigation satellite system (GNSS) (which may be referred to as "Galileo"), and the like configured to obtain a location of location unit 222 as one or more GPS and/or GNSS coordinates.

Microphone 224 may represent a transducer configured to convert sound waves (which are variations of air pressure) into electrical signals. Microphone 224 may output the electrical signals as audio data representative of audio in the vicinity of microphone 224. Although described as a Microphone 224 may represent one example of sensor 104 shown in the example of FIG. 1.

Scent sensor 226 may represent a chemical scent sensor capable of capturing scent data reflective of a scent in the general vicinity of scent sensor 226. Scent sensor 226 may also be referred to as an electronic nose or an e-nose. Scent sensor 226 may represent any one of sensors 104 shown in the example of FIG. 1.

As further shown in the example of FIG. 2, storage device 208 stores an access module 228, which includes an image analysis module 230, an scent analysis module 232, an audio analysis module 234, and a prediction module 236. Processing units 204 may interface with storage device 208 to retrieve one or more instructions of access module 228 that, when executed, cause processing units 204 to perform operations directed to enabling automated access to vehicle 101 as discussed above. Reference to module 228 performing various operations should be understood to refer to processing units 204 performing the various operations discussed with respect to module 228 (including sub-modules 230-236).

In any event, access module 228 may first authenticate a person approaching vehicle 101 as authorized to access vehicle 101 (or, in other words, that the person is the authorized operator of vehicle 101). In some instances, access module 228 may interface via a wireless protocol (e.g., Bluetooth®, WiFi™, etc.) with a key fob in possession of the person, and authenticate the person as the authorized operator based on the presence of the key fob associated with vehicle 101 in proximity to vehicle 101 (but external to vehicle 101).

In these and other instances, the key fob may be replaced or augmented with a smart device (such as a so-called "smart phone," "smart watch," or other smart device), whereupon vehicle 101 is associated with the smart device, which may execute an application by which to interface with vehicle 101. In these instances, access module 228 may authenticate the person as the authorized operator based on a wireless connection with the smart device, which may operate similar to the key fob in order to authenticate the person as the authorized operator when in the vicinity of vehicle 101 (but external to vehicle 101).

In conjunction with or as an alternative to the above authentication procedures involving a key fob and/or smart device, access module 228 may interface with sensors 104 (where particular examples of sensors 104 are shown in FIG. 2 as camera 220, microphones 224, and scent sensor 226) to retrieve image data 250, scent data 252, and/or audio data 254, and authenticate the person approaching vehicle 101 based on one or more of the image data 250, scent data 252, and/or audio data 254. For example, access module 228 may invoke image analysis module 230, which may perform image analysis with respect to image data 250 to authenticate the person approaching vehicle 101 as the authorized operator. The image analysis may include facial recognition in which control system 102 analyzes facial geometries of the person captured by image data 250.

Image analysis module 230 may include one or more trained models 231, which may represent models trained using machine learning based on images of the authorized operator of vehicle 101. That is, trained models 231 may include one or more machine learning models trained using images captured of the authorized operator (via cameras of a smart device used or associated with the authorized operator, camera 220 located externally or internally to vehicle 101, etc.). Examples of machine learning include nearest neighbor, naïve Bayes, decision trees, linear regression, support vector machines, neural networks, k-Means clustering, Q-learning, temporal difference, deep adversarial networks, evolutionary algorithms or other supervised, unsupervised, semi-supervised, or reinforcement learning algorithms to train one or more models.

Image analysis module 230 may apply one or more of trained models 231 (as there may be a distinct or separate model for each authorized operator of vehicle 101) to image data 250 to authenticate the person approaching vehicle 101 as the authorized operator. Trained models 231 may output an indication of whether the person is the authorized operator of vehicle 101 for which access module 228 should open the portion of vehicle 101.

As another example, access module 228 may invoke scent analysis module 232, which may perform scent recognition with respect to scent data 252 (obtained via scent sensor 226) to identify the person as the authorized operator. Scent analysis module 232 may, similar to image analysis module 230, include one or more trained models 233 that may represent models trained using machine learning based on scent data 252 captured via scent sensor 226 associated with the authorized operator of vehicle 101. Again, examples of machine learning include nearest neighbor, naïve Bayes, decision trees, linear regression, support vector machines, neural networks, k-Means clustering, Q-learning, temporal difference, deep adversarial networks, evolutionary algorithms or other supervised, unsupervised, semi-supervised, or reinforcement learning algorithms to train one or more models.

Scent analysis module 232 may apply one or more of trained models 233 (as there may be a distinct or separate model for each authorized operator of vehicle 101) to scent data 252 to authenticate the person approaching vehicle 101 as the authorized operator. Trained models 233 may output an indication of whether the person is the authorized operator of vehicle 101 for which access module 228 should open the portion of vehicle 101.

As yet another example, access module 228 may invoke audio analysis module 234, which may perform audio recognition with respect to audio data 254 to identify the person as the authorized operator. Audio analysis module 234 may, similar to image analysis module 230 and scent analysis module 232, include one or more trained models 235 that may represent models trained using machine learning based on audio data 254 associated with the authorized operator of vehicle 101. Again, examples of machine learning include nearest neighbor, naïve Bayes, decision trees, linear regression, support vector machines, neural networks, k-Means clustering, Q-learning, temporal difference, deep adversarial networks, evolutionary algorithms or other supervised, unsupervised, semi-supervised, or reinforcement learning algorithms to train one or more models.

Audio analysis module 234 may apply one or more of trained models 235 (as again there may be a distinct or separate model for each authorized operator of vehicle 101) to audio data 254 to authenticate the person approaching vehicle 101 as the authorized operator. Trained models 235 may output an indication of whether the person is the authorized operator of vehicle 101 for which access module 228 should open the portion of vehicle 101.

In this respect, audio analysis module 234 may perform voice recognition with respect to the audio data to identify the person as the authorized operator. That is, audio analysis module 234 may perform voice recognition with respect to the audio data to authenticate the person as the authorized operator (where voice recognition for the purposes of authentication may be referred to as "voice authentication").

Although described as being performed independently of each other, access module 228 may invoke two or more of modules 230-236 in order to determine whether the operator is the authorized operator. In some examples, access module 228 may be configured to invoke each of modules 230-236 in turn dependent upon whether authorization of the person is successful (considering, as one example, that each of the various processes described with respect to modules 230-236 may work better than other processes in certain conditions—as some of the processes described with respect to modules 230-236 may, in one example, be weather dependent—where, for example, audio analysis and scent analysis may perform with greater accuracy in less windy conditions while image analysis may perform with greater accuracy in clearer and higher light conditions, etc.).

Responsive to authenticating the person as the authorized operator in accordance with one or more of the above processes, access module 228 may next determine that the authorized operator of vehicle is intending to access at least a portion, such as a trunk or other compartment, main cabin, etc., of vehicle 101. Access module 228 may again invoke image analysis module 230, which may perform image analysis with respect to image data 250 to determine an occupancy of one or more hands of the authorized operator. Based on the determined occupancy of the one or more hands of the authorized operator (e.g., when the one or more hands of the authorized operator are occupied with bags, parcels, and/or other items), access module 228 may determine (possibly through application of one or more of trained models 231) that the authorized operator is intending to access the portion of vehicle 101.

In some instances, as either as alternative to or in conjunction with the above image analysis, access module 228 may invoke audio analysis module 234, which may perform an auditory analysis with respect to audio data 254 to determine whether audio data 254 indicates that the authorized operator is intending to access the portion of vehicle 101. That is, audio analysis module 234 may perform voice recognition (which may involve application of one or more of trained models 235) to determine whether audio data 254 indicates that the authorized operator is requesting that the portion of vehicle 101 be opened.

In addition or as an alternative to any combination of the foregoing determinations that the authorized operator is intending to access the portion of vehicle 101, access module 228 may invoke prediction module 236, which may obtain past access (PA) data 256 and apply one or more trained models 237 to PA data 256 to obtain current access (CA) data 258. Prediction module 236 may obtain PA data 256 from remote system 120 (as shown in FIG. 1), a smartphone or other device associated with the authorized operator, etc. as described above.

Responsive to determining that the authorized operator is intending to access the portion of vehicle 101, access module 238 may output a confirmation request (CR) 260 to the authorized operator. The confirmation request may request confirmation that the authorized operator is intending to access the portion of vehicle 101.

Access module 228 may output the confirmation request in one or more different ways. For example, access module 228 may interface (potentially via one or more ECUs) with an external light 106 (or more than one external light although a single external light 106 is shown in the example of FIG. 1), outputting a light signal to external light 106 that causes external light 106 to blink off and on as a prompt for the authorized operator to provide a confirmation request (CR) 262. External light 106 is shown in the example of FIG. 1 as a headlight, but external light 106 may refer to any external light, including blinkers, tail lights, brake lights, vanity plate lights, etc.

Alternatively or in addition to blinking external light 106, access module 228 may interface with (possibly via one or more ECUs) a sound unit 108 (which may represent a vehicle horn in the example of FIG. 1), outputting a sound signal to sound unit 108 that causes sound unit 108 to emit one or more sounds as confirmation request 260 that prompts the authorized operator to provide a confirmation response. The sounds may for example include short car horn bursts, beeps, security system sounds, and the like.

The authorized operator may then issue, responsive to the confirmation request 260, a confirmation response 262 indicating whether the authorized operator is intending to access the portion of vehicle 101. As such, access module 228 may receive, from the authorized operator, confirmation response 262.

Access module 228 may, as one example, obtain confirmation response 262 by invoking image analysis module 230 to perform image analysis (possibly through application of one or more of trained models 231) with respect to image data 250 to identify a visual confirmation response. Examples of the visual confirmation response include a gesture, such as a hand gesture (e.g., a thumbs up hand gesture or a thumbs down hand gesture), a head gesture (such as nodding "yes" or "no"), a facial gesture (such as smiling or frowning), etc. Image analysis module 230 may identify visual confirmation response as the confirmation response 262.

In addition to or as an alternative to obtaining the visual confirmation response, access module 228 may invoke audio analysis module 234 to perform audio analysis (possibly through application of one or more of trained models 235) with respect to audio data 254 to identify an auditory confirmation response. The auditory confirmation response may include spoken words or phrases, such as "yes" or "no," "please" or "no thank you," "open" or "close" and the like. may then identify the auditory confirmation response as confirmation response 262 (or one of multiple confirmation responses in the case that both visual and auditory confirmation responses are employed).

Based on confirmation response 262, access module 228 may interact with the portion of vehicle 101 (possibly via the ECUs) to automatically open (and possibly unlock) the portion of vehicle 101. In this respect, access module 228 may automate access to the vehicle when the hands of the authorized operator are occupied without requiring any direct interaction with vehicle 101 that may involve awkward movements, such as a foot movement.

Figure 3:
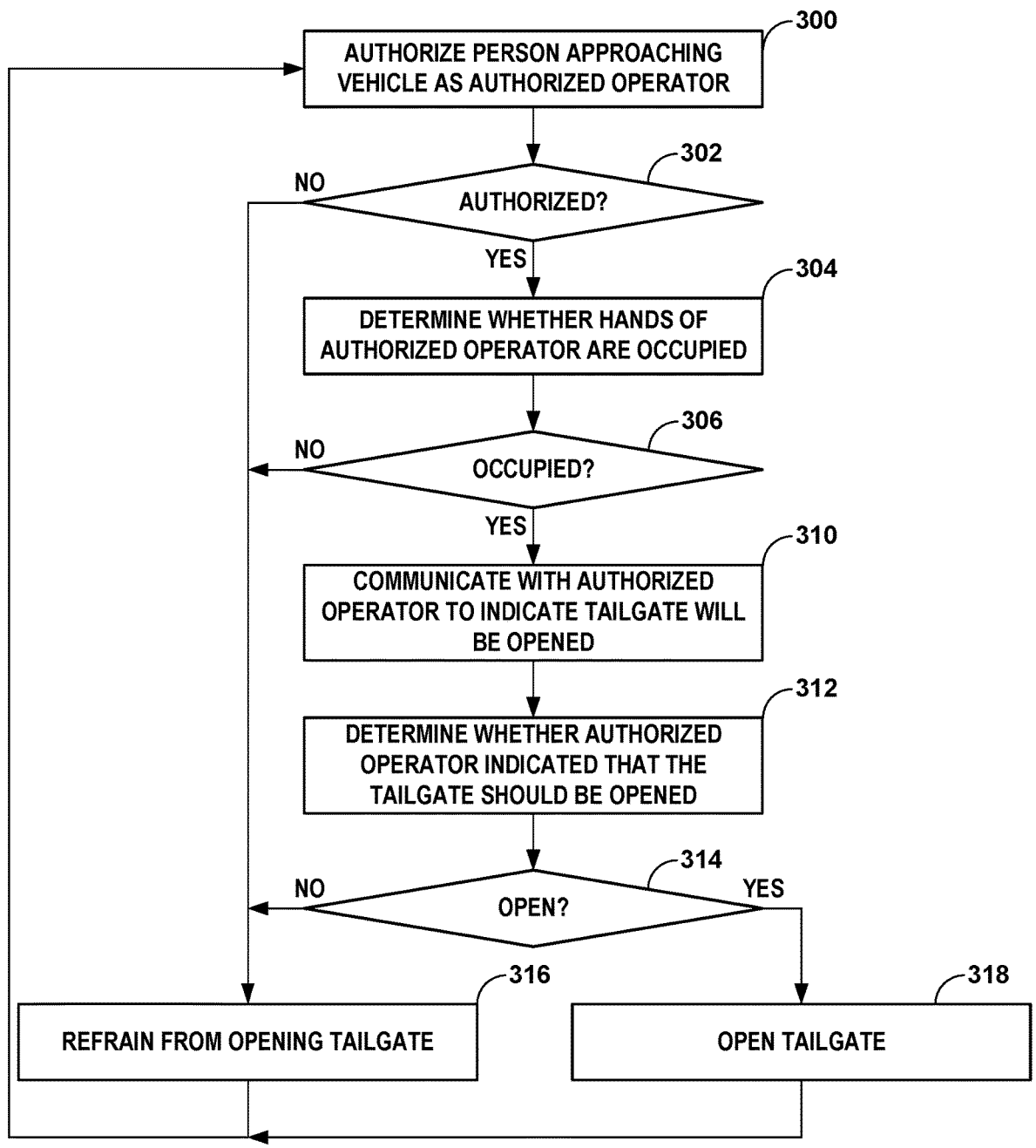
FIG. 3 is a flowchart illustrating example operation of a control system configured to perform various aspects of the automated access techniques described in this disclosure.

FIG. 3 is a flowchart illustrating example operation of a control system configured to perform various aspects of the automated access techniques described in this disclosure. As described above, control system 102 may first authorize person approaching vehicle 101 as an authorized operator (300). Vehicle 101 may include multiple cameras, which are placed in the exterior/interior of the car, and could be used to capture (or, in other words, acquire) the images of people. As discussed above, a machine learning algorithm can be pre-trained or actively trained on images of people who are authorized to have access to the tailgate. By being configured to identify the geometry of the authorized person's face, control system 102 may recognize the person potentially without any physical contact from a distance. In some examples, control system 102 may perform the image recognition in combination with identification of the car key (or smart watch, phone) or authorized person profile information to assert the authorization.

In some examples, as discussed in more detail above, control system 102 may perform voice authentication to recognize the person as the authorize person. The key for vehicle 101, a smartphone, and/or smartwatch may include a microphone and communicate the audio data to vehicle 101 or vehicle 101 may include the microphone used to capture (or, in other words, acquire) the audio data.

In some examples, control system 102 includes an electronic nose to recognize the scent of the person approaching vehicle 101. The electronic nose may identify the specific components of a smell using chemical detection and recognizes the pattern using machine learning.

When the person is not authorized as the authorized operator ("NO" 302), control system 102 may refrain from opening the tailgate (or other portion) (316). When the person is authorized as the authorized operator ("YES" 302), control system 102 may determine whether hands of the authorized operator are occupied (304). For example, control system 102 may analyse image data and/or other forms of data to determine whether the hands of the authorized operator are occupied. To illustrate other forms of data, control unit 102 may use data analytics with respect to GPS data and/or calendar data (e.g., for an online calendar) to predict intentions of the authorized operator, thereby potentially increasing the accuracy of the predictions. The predictions may recognize the probability of the tailgate being opened on certain occasions/times of the day (such as grocery shopping is generally performed on Sunday evenings at specific GPS locations). As such, control system 102 may perform data analytics with respect to this other data to perform intention recognition.

When the hands of the authorized operator are not occupied ("NO" 306), control system 102 may refrain from opening the tailgate (316). When the hands of the authorized operator are occupied ("YES" 306), control system 102 may communicate with the authorized operator to indicate the tailgate will be opened (e.g., via the confirmation request) (310) Next, control system 102 may determine whether the authorized operator indicated that the tailgate should be opened (e.g., via the confirmation response) (312).

In some instances, control system 102 may track a key associated with vehicle 101 to locate the authorized operator and opens the tailgate when the authorized operator is in proximity to the car with a confirmation from the authorized operator recorded by cameras or sensors. As a final confirmation, control system 102 may initiate a non-verbal dialogue by blinking a series of lights or sounds to which the authorized operator needs to confirm his or her intention to access the tailgate. Such authorized operator confirmations may include a nod, a gesture, or a voice expression that could be captured by cameras or other sensors.

In any event, when the confirmation response indicates that the tailgate is not to be opened ("NO" 314), control system 102 may refrain from opening the tailgate (316). When the confirmation response indicates that the tailgate is to be opened ("YES" 314), control system 102 may open the tailgate (318). The foregoing process may repeat as different persons approach vehicle 101 (300-318).

Figure 4:
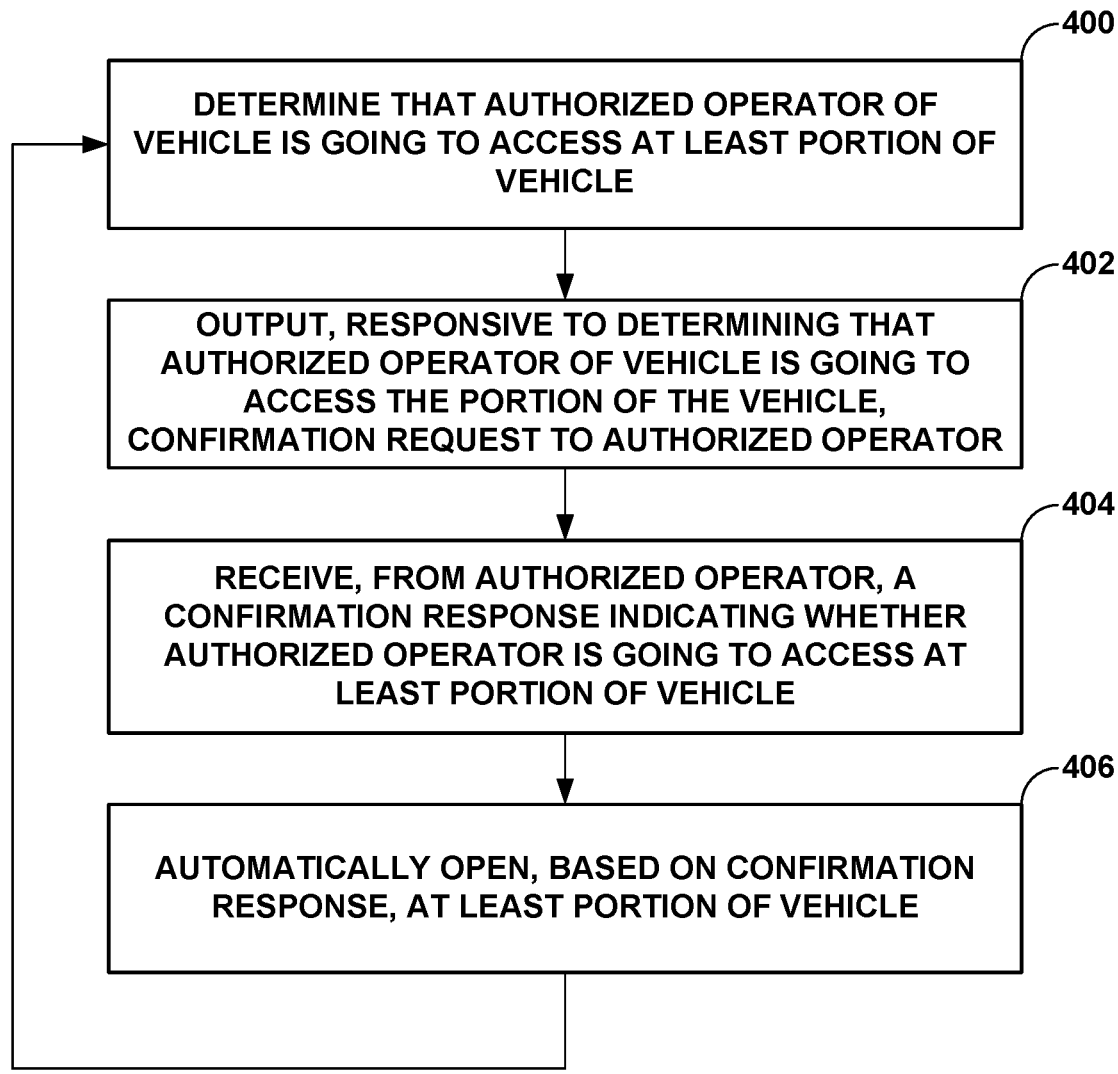
FIG. 4 is a flowchart illustrating additional example operation of a control system configured to perform various aspects of the automated access techniques described in this disclosure.

FIG. 4 is a flowchart illustrating additional example operation of a control system configured to perform various aspects of the automated access techniques described in this disclosure. As described in more detail above, control system 102 may determine that an authorized operator of vehicle 101 is intending to access at least a portion of vehicle 101 (400). Control system 102 may output, responsive to determining that the authorized operator is intending to access the portion of vehicle 101, a confirmation request (402).

Next, control system 102 may receive, from the authorized operator, a confirmation response indicating whether the authorized operator is intending to access at least the portion of the vehicle (404). Control system 102 may automatically open, based on the confirmation response, at least the portion of the vehicle (406).

In this way, various aspects of the techniques described in this disclosure may enable computing system 102 to operate as set forth in the following examples.

Example 1. A method comprising: determining, by a control system configured to control one or more aspects of a vehicle, that an authorized operator of the vehicle is intending to access at least a portion of the vehicle; outputting, by the control system and responsive to determining that the authorized operator of the vehicle is intending to access the portion of the vehicle, a confirmation request to the authorized operator, the confirmation request requesting confirmation that the authorized operator is intending to access at least the portion of the vehicle; receiving, by the control system, from the authorized operator, a confirmation response indicating whether the authorized operator is intending to access at least the portion of the vehicle; and automatically opening, by the control system, and based on the confirmation response, at least the portion of the vehicle.

Example 2. The method of example 1, wherein automatically opening at least the portion of the vehicle comprises interfacing with an automated opening mechanism to automatically open, without requiring physical input or electronic communication from the authorized operator, at least the portion of the vehicle.

Example 3. The method of any combination of claims 1 and 2, further comprising: capturing one or more images of a person approaching the vehicle; and performing facial recognition with respect to the one or more images to identify the person as the authorized operator.

Example 4. The method of any combination of claims 1-3, further comprising: capturing audio data representative of a voice of a person approaching the vehicle; and performing voice authentication with respect to the audio data to identify the person as the authorized operator.

Example 5. The method of any combination of examples 1-4, further comprising: capturing scent data representative of a scent of a person approaching the vehicle; and performing scent recognition with respect to the scent data to identify the person as the authorized operator.

Example 6. The method of any combination of examples 1-5, wherein determining that the authorized operator is intending to access at least the portion of the vehicle comprises: capturing one or more images of the authorized operator; performing image analysis with respect to the one or more images to determine an occupancy of one or more hands of the authorized operator; and determining, based on the determined occupancy of the one or more hands of the authorized operator, that the authorized operator is intending to access at least the portion of the vehicle.

Example 7. The method of any combination of examples 1-5, wherein determining that the authorized operator is intending to a access at least the portion of the vehicle comprises: obtaining past access data indicative of past accesses of at least the portion of the vehicle; predicting, based on the past access data, present access data indicative of a probability that the authorized operator is intending to access at least the portion of the vehicle; and determining, based on the present access data, that the authorized operator is intending to access at least the portion of the vehicle.

Example 8. The method of any combination of examples 1-5, wherein determining that the authorized operator is intending to access at least the portion of the vehicle comprises: obtaining audio data representative of a voice of the authorized operator; and performing auditory analysis with respect to the audio data to determine whether the audio data indicates that the authorized operator is intending to access at least the portion of the vehicle.

Example 9. The method of any combination of examples 1-8, wherein outputting the confirmation request comprises outputting a light signal to one or more external lights that cause the one or more external lights to blink off and on as a prompt for the confirmation response.

Example 10. The method of any combination of examples 1-8, wherein outputting the confirmation request comprises outputting a sound signal to one or more sound units that cause the one or more sound units to emit one or more sounds as a prompt for the confirmation response.

Example 11. The method of any combination of examples 1-10, wherein receiving the confirmation response comprises: obtaining one or more images of the authorized operator; performing image analysis with respect to the one or more images to identify a visual confirmation response; and identify the visual confirmation response as the confirmation response.

Example 12. The method of any combination of examples 1-10, wherein receiving the confirmation response comprises: obtaining audio data representative of a voice of the authorized operator; performing audio analysis with respect to the audio data to identify an auditory confirmation response; and identify the auditory confirmation response as the confirmation response.

Example 13. The method of any combination of examples 1-12, wherein at least the portion of the vehicle comprises a trunk of the vehicle or a rear-access compartment of the vehicle.

Example 14. The method of any combination of claims 1-13, further comprising: determining that the authorized operator of the vehicle is finished accessing at least the portion of the vehicle; and closing, responsive to determining that the authorized operator of the vehicle is finished accessing at least the portion of the vehicle, the portion of the vehicle.

Example 15. A control system configured to control one or more aspects of a vehicle associated with an authorized operator, the control system comprising: one or more processors; and a memory comprising instructions that, when executed by the one or more processors, cause the one or more processors to: determine that the authorized operator of the vehicle is intending to access at least a portion of the vehicle; output, responsive to determining that the authorized operator of the vehicle is intending to access the portion of the vehicle, a confirmation request to the authorized operator, the confirmation request requesting confirmation that the authorized operator is intending to access at least the portion of the vehicle; receive, from the authorized operator, a confirmation response indicating whether the authorized operator is intending to access at least the portion of the vehicle; and automatically open, based on the confirmation response, at least the portion of the vehicle.

Example 16. The control system of examples 15, wherein the one or more processors are configured to perform the method recited by any combination of examples 2-14.

Example 17. A computer-readable storage medium comprising instructions that, when executed by at least one processor of a control system configured to control one or more aspects of a vehicle associated with an authorized operator, cause the at least one processor to: determine that the authorized operator of the vehicle is intending to access at least a portion of the vehicle; output, responsive to determining that the authorized operator of the vehicle is intending to access the portion of the vehicle, a confirmation request to the authorized operator, the confirmation request requesting confirmation that the authorized operator is intending to access at least the portion of the vehicle; receive, from the authorized operator, a confirmation response indicating whether the authorized operator is intending to access at least the portion of the vehicle; and automatically open, based on the confirmation response, at least the portion of the vehicle.

Example 18. The computer-readable storage medium of example 17, further comprising instructions that, when executed by the at least one processor, cause the at least one processor to perform the method recited by any combination of examples 2-14.

Example 19. A control system configured to control one or more aspects of a vehicle associated with an authorized operator, the control system comprising: means for determining that the authorized operator of the vehicle is intending to access at least a portion of the vehicle; means for outputting, responsive to determining that the authorized operator of the vehicle is intending to access the portion of the vehicle, a confirmation request to the authorized operator, the confirmation request requesting confirmation that the authorized operator is intending to access at least the portion of the vehicle; means for receiving, from the authorized operator, a confirmation response indicating whether the authorized operator is intending to access at least the portion of the vehicle; and means for automatically opening, based on the confirmation response, at least the portion of the vehicle.

Example 20. The control system of example 19, further comprising means for performing each step of the method recited by any combination of examples 2-14.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a web site, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining, by a control module configured to control one or more aspects of a vehicle, an indication that an authorized operator of the vehicle is going to access at least a portion of the vehicle;
   outputting, by the control module and responsive to determining the indication that the authorized operator of the vehicle is going to access the portion of the vehicle, a confirmation request to the authorized operator, the confirmation request requesting confirmation that the authorized operator is going to access at least the portion of the vehicle;
   receiving, by the control module, from the authorized operator, a confirmation response indicating whether the authorized operator is going to access at least the portion of the vehicle;
   unlocking, by the control module, responsive to determining that at least the portion of the vehicle is locked, and based on the confirmation response, the at least the portion of the vehicle; and
   automatically opening, by the control module, after unlocking at least the portion of the vehicle, and based on the confirmation response, at least the portion of the vehicle without requiring physical input or electronic communication from the authorized operator, at least the portion of the vehicle.

2. The method of claim 1, further comprising:
   capturing one or more images of a person approaching the vehicle; and
   performing facial recognition with respect to the one or more images to identify the person as the authorized operator.

3. The method of claim 1, further comprising:
   capturing audio data representative of a voice of a person approaching the vehicle; and
   performing voice authentication with respect to the audio data to identify the person as the authorized operator.

4. The method of claim 1, further comprising:
   capturing scent data representative of a scent of a person approaching the vehicle; and
   performing scent recognition with respect to the scent data to identify the person as the authorized operator.

5. The method of claim 1, wherein determining that the authorized operator is going to access at least the portion of the vehicle comprises:
   capturing one or more images of the authorized operator;
   performing image analysis with respect to the one or more images to determine an occupancy of one or more hands of the authorized operator; and
   determining, based on the determined occupancy of the one or more hands of the authorized operator, that the authorized operator is going to access at least the portion of the vehicle.

6. The method of claim 1, wherein determining that the authorized operator is going to access at least the portion of the vehicle comprises:
   acquiring past access data indicative of past accesses of at least the portion of the vehicle;
   predicting, based on the past access data, present access data indicative of a probability that the authorized operator is going to access at least the portion of the vehicle; and
   determining, based on the present access data, that the authorized operator is going to access at least the portion of the vehicle.

7. The method of claim 1, wherein determining that the authorized operator is going to access at least the portion of the vehicle comprises:
   acquiring audio data representative of a voice of the authorized operator; and
   performing auditory analysis with respect to the audio data to determine whether the audio data indicates that the authorized operator is going to access at least the portion of the vehicle.

8. The method of claim 1, wherein outputting the confirmation request comprises outputting a light signal to one or more external lights that cause the one or more external lights to blink off and on as a prompt for the confirmation response.

9. The method of claim 1, wherein outputting the confirmation request comprises outputting a sound signal to one or more sound units that cause the one or more sound units to emit one or more sounds as a prompt for the confirmation response.

10. The method of claim 1, wherein receiving the confirmation response comprises:
acquiring one or more images of the authorized operator;
performing image analysis with respect to the one or more images to identify a visual confirmation response; and
identify the visual confirmation response as the confirmation response.

11. The method of claim 1, wherein receiving the confirmation response comprises:
acquiring audio data representative of a voice of the authorized operator;
performing audio analysis with respect to the audio data to identify an auditory confirmation response; and
identify the auditory confirmation response as the confirmation response.

12. The method of claim 1, wherein at least the portion of the vehicle comprises a trunk of the vehicle or a rear-access compartment of the vehicle.

13. The method of claim 1, further comprising:
determining that the authorized operator of the vehicle is finished accessing at least the portion of the vehicle; and
closing, responsive to determining that the authorized operator of the vehicle is finished accessing at least the portion of the vehicle, the portion of the vehicle.

14. A control system configured to control one or more aspects of a vehicle associated with an authorized operator, the control system comprising:
one or more processors; and
a memory comprising instructions that, when executed by the at least one processor, cause the one or more processors to:
determine that the authorized operator of the vehicle is going to access at least a portion of the vehicle;
provide, responsive to determining that the authorized operator of the vehicle is going to access the portion of the vehicle, a confirmation request to the authorized operator, the confirmation request requesting confirmation that the authorized operator is going to access at least the portion of the vehicle;
receive, from the authorized operator, a confirmation response indicating whether the authorized operator is going to access at least the portion of the vehicle;
unlock, responsive to determining that at least the portion of the vehicle is locked, and based on the confirmation response, the at least the portion of the vehicle; and
automatically open, based on the confirmation response, and after unlocking at least the portion of the vehicle, at least the portion of the vehicle without requiring physical input or electronic communication from the authorized operator, at least the portion of the vehicle.

15. The control system of claim 14, wherein the one or more processors are further configured to:
capture one or more images of a person approaching the vehicle; and
perform facial recognition with respect to the one or more images to identify the person as the authorized operator.

16. The control system of claim 14, wherein the one or more processors are further configured to:
capture audio data representative of a voice of a person approaching the vehicle; and
perform voice authentication with respect to the audio data to identify the person as the authorized operator.

17. A non-transitory computer-readable storage medium comprising instructions that, when executed by at least one processor of a control system configured to control one or more aspects of a vehicle associated with an authorized operator, cause the at least one processor to:
determine that the authorized operator of the vehicle is going to access at least a portion of the vehicle;
provide, responsive to determining that the authorized operator of the vehicle is going to access the portion of the vehicle, a confirmation request to the authorized operator, the confirmation request requesting confirmation that the authorized operator is going to access at least the portion of the vehicle;
receive, from the authorized operator, a confirmation response indicating whether the authorized operator is going to access at least the portion of the vehicle;
unlocking, responsive to determining that at least the portion of the vehicle is locked, and based on the confirmation response, the at least the portion of the vehicle; and
automatically open, based on the confirmation response, and after unlocking at least the portion of the vehicle, at least the portion of the vehicle without requiring physical input or electronic communication from the authorized operator, at least the portion of the vehicle.

18. A control system configured to control one or more aspects of a vehicle associated with an authorized operator, the control system comprising:
means for determining that the authorized operator of the vehicle is going to access at least a portion of the vehicle;
means for outputting, responsive to determining that the authorized operator of the vehicle is going to access the portion of the vehicle, a confirmation request to the authorized operator, the confirmation request requesting confirmation that the authorized operator is going to access at least the portion of the vehicle;
means for receiving, from the authorized operator, a confirmation response indicating whether the authorized operator is going to access at least the portion of the vehicle; and
means for unlocking, responsive to determining that at least the portion of the vehicle is locked, and based on the confirmation response, the at least the portion of the vehicle;
means for automatically opening, based on the confirmation response, and after determining that at least the portion of the vehicle is locked, at least the portion of the vehicle without requiring physical input or electronic communication from the authorized operator, at least the portion of the vehicle.

* * * * *